US012464023B2

United States Patent
Agarwal

(10) Patent No.: US 12,464,023 B2
(45) Date of Patent: Nov. 4, 2025

(54) ENDPOINT-BASED SECURITY

(71) Applicant: Kunal Agarwal, Mountain View, CA (US)

(72) Inventor: Kunal Agarwal, Mountain View, CA (US)

(73) Assignee: DOPE.SECURITY INC., Mountain View, CA (US)

( * ) Notice: Subject to any disclaimer, the term of this patent is extended or adjusted under 35 U.S.C. 154(b) by 285 days.

(21) Appl. No.: 18/309,541

(22) Filed: Apr. 28, 2023

(65) Prior Publication Data
US 2024/0364743 A1    Oct. 31, 2024

(51) Int. Cl.
*H04L 9/40*    (2022.01)

(52) U.S. Cl.
CPC .................... *H04L 63/20* (2013.01)

(58) Field of Classification Search
CPC .............. H04L 63/20; H04L 63/166
See application file for complete search history.

(56) References Cited

U.S. PATENT DOCUMENTS

| 7,426,556 | B2 | 9/2008 | Sankaran et al. |
| 10,122,577 | B1* | 11/2018 | Rykowski ............... G06F 16/83 |
| 11,711,343 | B2 | 7/2023 | Chambers et al. |
| 2007/0253339 | A1 | 11/2007 | Ovadia et al. |
| 2015/0121464 | A1 | 4/2015 | Hughes et al. |
| 2015/0326615 | A1 | 11/2015 | Sinha |
| 2016/0173488 | A1* | 6/2016 | Xie ....................... H04L 9/3263 |
| | | | 713/156 |
| 2017/0069003 | A1 | 3/2017 | Barta et al. |
| 2017/0324762 | A1 | 11/2017 | Chow et al. |
| 2018/0131751 | A1* | 5/2018 | Jones ..................... H04L 67/566 |
| 2019/0044914 | A1 | 2/2019 | Kleiner et al. |
| 2020/0106743 | A1 | 4/2020 | Park et al. |
| 2021/0218709 | A1 | 7/2021 | Kahol et al. |
| 2023/0385364 | A1* | 11/2023 | Aher ................... G06F 16/9535 |

* cited by examiner

*Primary Examiner* — El Hadji M Sall
(74) *Attorney, Agent, or Firm* — Kunzler Bean & Adamson

(57) ABSTRACT

Apparatuses, methods, systems, and program products are disclosed for endpoint-based security. An apparatus includes a processor and a memory that is coupled to the processor. The memory includes instructions that are executable by the processor to detect that a network connection between an application executing on the apparatus and a remote device is not connected due to an SSL error, upload an indication of the SSL error to a central server, and receive instructions from the central server for performing an SSL inspection bypass procedure on the apparatus to establish the network connection between the application and the remote device.

18 Claims, 11 Drawing Sheets

ENDPOINT-BASED SECURITY

FIELD

This invention relates to computer networks and more particularly relates to endpoint-based network security.

BACKGROUND

A computer network is a set of computers sharing resources located on or provided by network nodes. Computers use common communication protocols over digital interconnections to communicate with each other. These interconnections are made up of telecommunication network technologies based on physically wired, optical, and wireless radio-frequency methods that may be arranged in a variety of network topologies.

SUMMARY

Apparatuses, methods, systems, and program products are disclosed for endpoint-based security. In one embodiment, an apparatus for endpoint-based security includes a processor and a memory that is coupled to the processor. The memory includes instructions that are executable by the processor to detect that a network connection between an application executing on the apparatus and a remote device is not connected due to a secure socket layer ("SSL") error, upload an indication of the SSL error to a central server, and receive instructions from the central server for performing an SSL inspection bypass procedure on the apparatus to establish the network connection between the application and the remote device.

A method for endpoint-based security, in one embodiment, includes detecting that a network connection between an application executing on the apparatus and a remote device is not connected due to an SSL error, uploading an indication of the SSL error to a central server, and receiving instructions from the central server for performing an SSL inspection bypass procedure on the apparatus to establish the network connection between the application and the remote device.

An apparatus for endpoint-based security, in one embodiment, includes a processor and a memory that is coupled to the processor. The memory includes instructions that are executable by the processor to receive an indication of an SSL error for a network connection between an application executing n an end-user device and a remote device, identify instructions for performing an SSL inspection bypass procedure on the end-user device to establish the network connection between the application and the remote device, and transmit the instructions to the end-user device.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
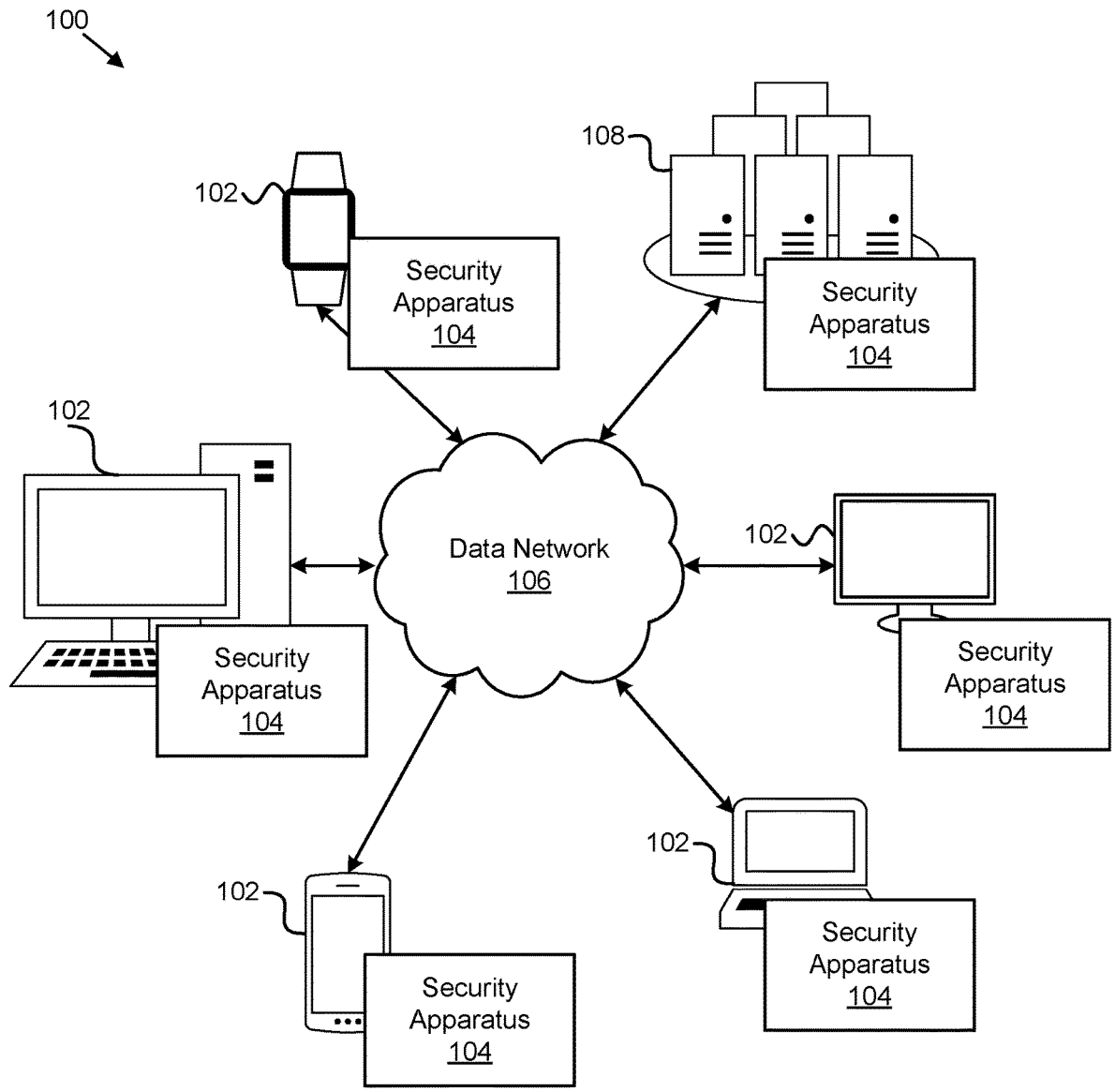
FIG. 1 is a schematic block diagram illustrating one embodiment of a system for endpoint-based security.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, to emphasize their implementation independence more particularly. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, FPGA, or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses, systems, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Apparatuses, methods, systems, and program products are disclosed for endpoint-based security. In one embodiment, an apparatus for endpoint-based security includes a processor and a memory that is coupled to the processor. The memory includes instructions that are executable by the processor to detect that a network connection between an application executing on the apparatus and a remote device is not connected due to an SSL error, upload an indication of the SSL error to a central server, and receive instructions from the central server for performing an SSL inspection bypass procedure on the apparatus to establish the network connection between the application and the remote device.

In one embodiment, network traffic between the application and the remote device is routed through a proxy. In one embodiment, the instructions are executable by the processor to detect that the network connection between the application and the remote device is not connected due to the SSL error by intercepting an error message from the application indicating that the connection to the remote device is closed.

In one embodiment, the error message indicates a failure with an SSL handshake procedure between the application and the remote device. In one embodiment, the instructions are executable by the processor to detect that the network connection between the application and the remote device is not connected due to the SSL error by detecting that the application continually retries to establish a connection to the remote device without receiving a response.

In one embodiment, the instructions are executable by the processor to detect that the network connection between the application and the remote device is not connected due to the SSL error by detecting that the network connection closed prematurely.

In one embodiment, the instructions are executable by the processor to prompt the user for confirmation to bypass SSL inspection for the application as part of the SSL bypass procedure.

In one embodiment, the instructions are executable by the processor automatically enable SSL inspection bypass for the application without user intervention. In one embodiment, the instructions are executable by the processor to add the application to a whitelist of applications that bypass SSL inspection as part of the SSL inspection bypass procedure.

A method for endpoint-based security, in one embodiment, includes detecting that a network connection between an application executing on the apparatus and a remote device is not connected due to an SSL error, uploading an indication of the SSL error to a central server, and receiving instructions from the central server for performing an SSL inspection bypass procedure on the apparatus to establish the network connection between the application and the remote device.

In one embodiment, network traffic between the application and the remote device is routed through a proxy. In one embodiment, detecting that the network connection between the application and the remote device is not connected due to the SSL error comprises intercepting an error message from the application indicating that the connection to the remote device is closed.

In one embodiment, the error message indicates a failure with an SSL handshake procedure between the application and the remote device. In one embodiment, detecting that the network connection between the application and the remote device is not connected due to the SSL error comprises detecting that the application continually retries to establish a connection to the remote device without receiving a response.

In one embodiment, detecting that the network connection between the application and the remote device is not connected due to the SSL error comprises detecting that the network connection closed prematurely.

In one embodiment, the method includes prompting the user for confirmation to bypass SSL inspection for the application as part of the SSL bypass procedure. In one embodiment, the method includes automatically enabling SSL inspection bypass for the application without user intervention. In one embodiment, the method includes adding the application to a whitelist of applications that bypass SSL inspection as part of the SSL inspection bypass procedure.

An apparatus for endpoint-based security, in one embodiment, includes a processor and a memory that is coupled to the processor. The memory includes instructions that are executable by the processor to receive an indication of an SSL error for a network connection between an application executing n an end-user device and a remote device, identify instructions for performing an SSL inspection bypass procedure on the end-user device to establish the network connection between the application and the remote device, and transmit the instructions to the end-user device.

In one embodiment, the instructions are executable by the processor to push the SSL error information to at least one other apparatus for bypassing SSL inspection for the application executing on the at least one other apparatus.

FIG. 1 is a schematic block diagram illustrating one embodiment of a system 100 for endpoint-based security. In one embodiment, the system 100 includes one or more information handling devices 102, one or more security apparatuses 104, one or more data networks 106, and one or more servers 108. In certain embodiments, even though a specific number of information handling devices 102, security apparatuses 104, data networks 106, and servers 108 are depicted in FIG. 1, one of skill in the art will recognize, in light of this disclosure, that any number of information handling devices 102, security apparatuses 104, data networks 106, and servers 108 may be included in the system 100.

In one embodiment, the system 100 includes one or more information handling devices 102. An information handling device 102 may be embodied as one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, head phones, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, an FPGA or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

In general, in one embodiment, the security apparatus 104 is configured to receive, at an end user device (e.g., a user's smart phone, tablet computer, laptop computer, smart watch, or the like), a request for content from a network source, compare the network source of the requested content against a policy that is stored on the end user device prior to the content being allowed on the end user device, and perform at least one action related to the requested content based on the comparison between the network source of the requested content and the policy. In various embodiments, the security apparatus 104 may be embodied as a service, a background process, an agent, a plugin, and addon, and/or the like. In certain embodiments, the security apparatus acts as a, or works together with a, local network filter driver, e.g., a local virtual private network on iOS that performs the check to determine whether the network source is allowed or blocked. In various embodiments, an HTTP 2 or HTTP 3 proxy may be used as part of the filter driver, instead of downgrading the network request to a suboptimal version, e.g., HTTP 1.1.

In various embodiments, the security apparatus 104 is installed with authorizations in place so that the security apparatus 104 cannot be uninstalled, hacked, or otherwise tampered with on an end user device without the proper permissions or authorizations. Moreover, the security apparatus 104 may require a user to create an account and setup electronic access permissions using a username/password, PIN, passphrase, biometric authentication, OAuth, or another authorization method, e.g., using credentials for a third party account such as Google®, Facebook®, or the like. In one embodiment, the security apparatus 104 may cross-reference the user-provided access information with a directory service for an organization associated with the end user device, e.g., Active Directory®, to verify and validate that the user is in fact associated with the organization (e.g., is an employee, a contractor, and/or the like).

In this manner, the security apparatus 104 monitors and analyzes network traffic requests and content at the end user device based on a policy that is stored on the end user device, as opposed to forwarding the network traffic request or content to a remote device, e.g., a cloud server, a proxy device, and/or other remotely located service. Not only does this provide for a more efficient way to analyze network traffic requests and/or network content that is received at the end user device, but the claimed solution also allows for customization of the policy stored on the end user device, which may be provided by an organization or company issuing the end user device, based on the end user's activities (e.g., browsing activity) and preferences. Moreover, the security apparatus 104 reduces the number of data centers and/or the sizes of data centers that are used for analyzing network traffic because the security apparatus 104 moves the decision making regarding whether to allow or block content from a network source, whether the content is safe to allow on the end user device, and/or the like, to the end user device instead of taking additional steps to transmit the network request or received content to a data center and then wait for a response from the data center. The security apparatus 104 is described in more detail below with reference to FIG. 3.

In certain embodiments, the security apparatus 104 may include a hardware device such as a secure hardware dongle or other hardware appliance device (e.g., a set-top box, a network appliance, or the like) that attaches to a device such as a head mounted display, a laptop computer, a server 108, a tablet computer, a smart phone, a security system, a network router or switch, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the security apparatus 104 may include a power interface, a wired and/or wireless network interface, a graphical interface that attaches to a display, and/or a semiconductor integrated circuit device as described below, configured to perform the functions described herein with regard to the security apparatus 104.

The security apparatus 104, in such an embodiment, may include a semiconductor integrated circuit device (e.g., one or more chips, die, or other discrete logic hardware), or the like, such as an FPGA or other programmable logic, firmware for an FPGA or other programmable logic, microcode for execution on a microcontroller, an ASIC, a processor, a processor core, or the like. In one embodiment, the security apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the security apparatus 104.

The semiconductor integrated circuit device or other hardware appliance of the security apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the security apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN") (e.g., a home network), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. Functionally, the one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102 and may be configured to store network security policies including website information, e.g., website validity/reputation scores, website access lists, and/or the like. The servers 108 may further be configured to execute or run network security algorithms, programs, applications, processes, and/or the like such as maliciousness analysis programs, data sensitivity analysis programs, granular action control analysis programs, and request body control analysis programs.

Figure 2:
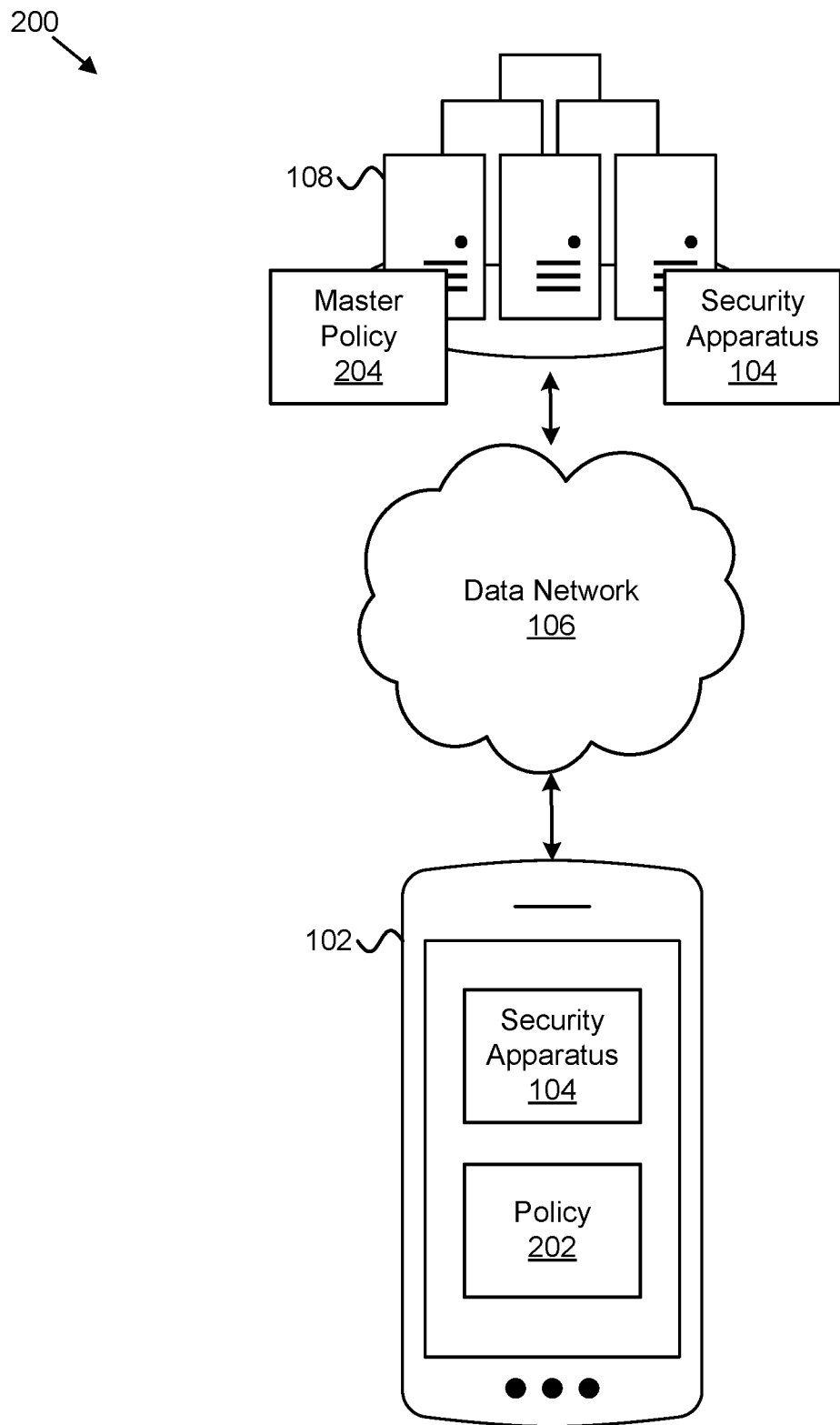
FIG. 2 is a schematic block diagram illustrating one embodiment of a system for endpoint-based security.

FIG. 2 depicts another embodiment of a system 200 for endpoint-based security. In one embodiment, the system 200 includes an information handling device 102 that is an end user device such as a smart phone, a tablet computer, a smart watch, and/or the like. The end user device includes an embodiment of a security apparatus 104 and a policy 202. The security apparatus 104 may be substantially similar to the security apparatus 104 described above with reference to FIG. 1 and is described in more detail below with reference to FIG. 3.

The policy 202, in one embodiment, is stored locally on the end user device and includes network security information that the security apparatus 104 uses to determine whether to allow or block a request for content from a network source; whether to allow content on the end user device such as websites, files, documents, images, videos, scripts, applications, and/or the like that are accessible from the network source over the data network 106; and/or the like. The policy 202, in one embodiment, includes general configuration information for the security apparatus 104 including a set of allowed and blocked websites, uniform resource locators ("URLs"), ports (e.g., block all outbound ports except 80 and 443, and/or only allow a particular set of URLs on port 22, and/or the like), processes, and/or the like; categories of network sources, content, and/or the like that is allowed on or blocked from the end user device; devices or network sources that the end user device is allowed to upload content to; and/or the like. Categories, as used herein, may comprise predefined groups of network sources such as websites (e.g., news sites, sports sites, social media sites, video sites, and/or the like), content types (e.g., websites, images, videos, audio, documents, and/or the like), and/or the like that are similar and can be allowed on or blocked from the end user device together.

In an example embodiment, when a user makes a request for content that is located on a remote or networked location, e.g., that is accessible over the Internet, the security apparatus 104 may check the request against information in the policy 202 to determine whether to allow the request to be sent to the remote location for accessing the content. If the policy 202 does not allow such a request, e.g., because the network source for the request is not on an allowed network source list or is listed on a blocked network source list, then the security apparatus 104 may prevent, ignore, discard, block, or the like the request for the content such that the content is not permitted on the end user device. In this manner, the security apparatus 104 performs local, on-device network security checks, based on a policy that is stored locally on the end user device instead of forwarding the network request to a remotely-located server, cloud device, proxy server, and/or the like.

In one embodiment, the end user device is communicatively coupled to one or more devices or servers 108 over a data network 106. More particularly, the security apparatus 104 executing on the end user device may be communicatively coupled to or in communication with the security apparatus 104 executing on the server 108. The servers 108 may be associated with, owned by, managed by, or the like, an organization, entity, company, or the like that issues the end user device.

A master policy 204 may be stored on a server 108 (e.g., acting as a master entity for the organization or company) and used as a base or default policy for end user devices and to synchronize, coordinate, update, refresh, configure, or the like the policy 202 that is stored locally on the end user device, which may be one of a plurality of end user devices for an organization or company. The master policy 204 may include configuration information for the security apparatus 104 on the end user device and/or the master entity, may include network security information such as a cache that contains a set of allowed and/or blocked websites, URLs, files, and/or other network locations and/or content that is defined for the entire organization, entity, or company. Each end user device may then supplement, add-to, or the like the locally-stored policy 202 based on the user's network activity, e.g., browsing history, program usage, content consumption, and/or the like. As described in more detail below, the master policy 204 may be used to initially configure or setup the locally-stored policy 202, to refresh or update the locally-stored policy, to reconfigure the locally-stored policy in the event that the locally-stored policy 202 is deleted, corrupted, or the like, and/or the like.

Figure 3:
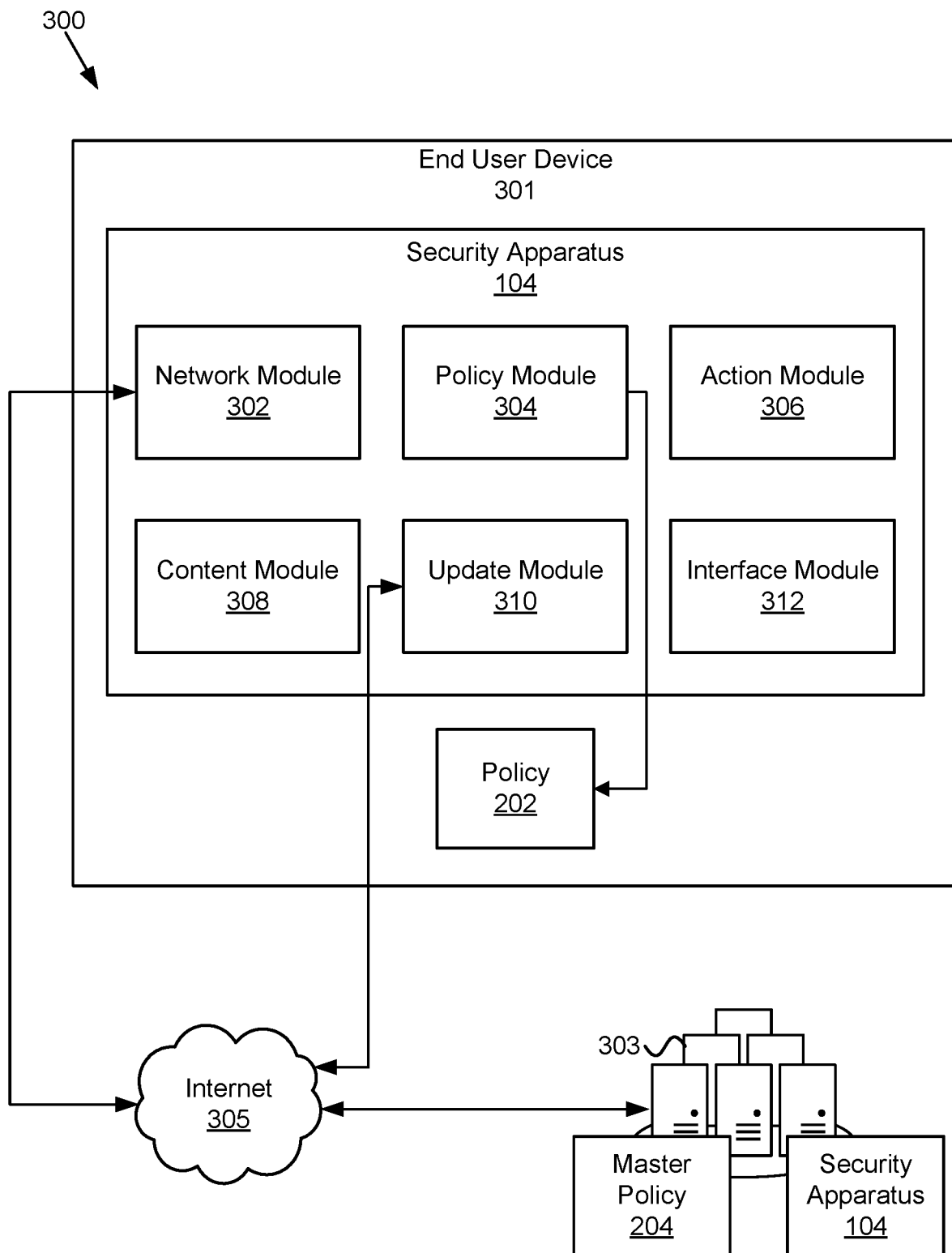
FIG. 3 is a schematic block diagram illustrating one embodiment of a system for endpoint-based security.

FIG. 3 depicts one embodiment of another system 300 for endpoint-based security. In one embodiment, the system 300 includes an end user device 301, which may be embodied as an information handling device 102, described above. In one embodiment, the end user device 301 is issued by, distributed by, or otherwise provided by an organization, company, or other entity and managed, maintained, or the like by the organization, company, or other entity. The system 300 further includes a data network such as the Internet 305 that is used to communicatively couple the end user device 301 to a master entity 303, which may be a single device or a plurality of devices that are maintained, managed, or the like for an organization or company.

In one embodiment, the system 300 includes a security apparatus 104, located on both the end user device 301 and the master entity 303, a local policy 202 that is located on the end user device 301, and a master policy 204 that is located on the master entity 303. The security apparatus 104, in one embodiment, includes one or more of a network module 302, a policy module 304, an action module 306, a content module 308, an update module 310, and an interface module 312, which are described in more detail below.

In one embodiment, the network module 302 is configured to receive, intercept, determine, identify, and/or the like, at the end user device 301, a request for content from a network source. The request may include a request sent over a hypertext transfer protocol ("HTTP"), over a file transfer protocol ("FTP"), and/or the like. The request may include a network location, a network source, an identifier for a network device, and/or the like where the content is located. For example, the request may include an internet protocol ("IP") address, a media access control ("MAC") address, a domain name, a web address, and/or the like.

In various embodiments, the network module 302 may receive or intercept the request at prior to the request being transmitted from the end user device 301 to the network source or location identified in the request. For example, the network module 302 may receive the request at the operating system level, e.g., in response to a request submitted in a web browser, at the hardware level, e.g., as part of firmware for a network interface controller, and/or the like.

In one embodiment, the policy module 304 is configured to compare the network source of the requested content against a policy that is stored on the end user device prior to the content being allowed on the end user device 301. The policy 202, as used herein, may comprise a file, table, database, and/or the like that defines network traffic, content types, permissions, users, network sources, ports, IP address, MAC addresses, domains, and/or the like that are allowed, authorized, forbidden, blocked, unauthorized, and/or the like in relation to the end user device 301. The policy 202, in one embodiment, is stored locally on the end user device 301 so that checks against the policy occur locally on the end user device instead of being transmitted to a remote location, e.g., over the Internet 305, for checking against a remotely-located policy.

In one embodiment, the policy 202 comprises a cache of network sources that are allowed on the end user device. The cache may include a list, table, database, a structured language file, or the like of different network sources that are either allowed to access for content and/or blocked from accessing. The cache, for example, may include a set of websites, domains, IP addresses, MAC addresses, ports, and/or other network location identifiers or addresses.

In one embodiment, the cache includes an aggregation of different websites or domains that include a plurality of commonly accessed websites in general, e.g., the top or most popular 500, 1000, 5000, or the like websites that are accessed on the web or Internet among the general public, within a country or region, or the like. In some embodiments, the cache further includes different websites or domains across devices that are part of a group, an organization or company that issues the end user device 301, and/or other entities. For instance, the policy module 304 may track the number of websites or domains, e.g., 500, 1000, 5000, or the like, that are the most popular or commonly accessed by the users of a group, department, organization, company, or the like. Further, the cache may include the top 500, 1000, 5000, or the like, websites that are commonly accessed by the user of the end user device 301. Thus, the cache may include an intersection of the aggregation of different network sources, e.g., the most popular, or most common websites or domains accessed in general, for a company/organization, and/or for the user.

In one embodiment, the policy module 304 downloads an initial cache of network sources to the end user device 301 when the end user device 301 is first setup, is reset, when the cache is cleared, if the cache is corrupted or poisoned, and/or the like. For example, when a user first sets up a company-issued smart phone, the policy module 304 may communicate with a server 108 that is owned, managed, maintained, or the like by a company to receive a policy 202, which may be based on the master policy 204, that includes an initial cache of network sources. In such an embodiment, the initial cache set may include a predefined or predetermined number of network sources that covers a threshold amount of the user's network traffic, e.g., 75%, 90%, 95%, or the like, based on the most popular websites accessed generally, the most commonly accessed websites by employees/people within the company/organization, and/or the like.

In one embodiment, the action module 306 is configured to perform at least one action related to the requested content based on the comparison between the network source of the requested content and the policy. The at least one action, for instance, may be to allow the content to be loaded, downloaded, and/or accessed by the end user device 301 from the network source in response to the network source being listed as an allowed network source in the set of network sources in the cache. In some embodiments, described in more detail below with reference to the content module 308, the content may be further analyzed to determine whether it is malicious, whether it contains malware, and/or the like.

In one embodiment, the at least one action that the action module 306 performs includes blocking the requested content from being allowed on the end user device 301 in response to the network source of the requested content not being allowed according to the policy 202. For instance, if the cache of network sources in the policy 202 lists network sources where content is allowed to be accessed from, and the request is for a network source that is not on the list, then the action module 306 may ignore, discard, block, prevent, or the like the request from being transmitted from the end user device 301 to the network source. In certain embodiments, the policy may include a listing of network sources that are blocked or otherwise not allowed to access such that if the network source for the request is on the list, the action module 306 ignores, discards, blocks, prevents, or the like the request from being transmitted from the end user device 301 to the network source.

In one embodiment, the at least one action that the action module 306 performs further comprises presenting a warning on the end user device 301 that the requested content is blocked according to the policy 202. The action module 306 may present a warning page in a web browser, a push notification for a mobile application, a text message, an email message, and/or the like. In certain embodiments, the action module 306 provides an option as part of the warning for the user to override the block and access the content, which may be based on the user's permissions, authority, role, and/or the like. For instance, the user may need to enter a code, PIN, password, or the like to override the block and access the content from the blocked network source.

In one embodiment, the at least one action that the action module 306 performs further comprises redirecting the request for the content to a master entity 303, e.g., a server 108 managed or maintained by a company or organization associated with the end user device 301. An action module 306 located at the master entity 303, in one embodiment, validates the end user device 301, e.g., ensures that the end user device 301 is an authorized end user device 301 such as a device issued or provided by a company/organization associated with the master entity 303 e.g., based on a device identifier, a code/key stored in a trusted platform module for the device, a serial number, a model number, and/or the like. In response to validating the end user device 301, the action module 306 at the master entity 303 retrieves the requested content from the network source for the end user device 301. The action module 306 at the master entity 303, for instance, upon validating the end user device 301, may forward the request for content to the network source of the request, receive the requested content, and forward the received content to the end user device 301. In this manner, the master entity 303, which may include additional security features, programs, algorithms, components, elements, or the like can access the content from the network source that may be blocked or otherwise inaccessible to the end user device 301, verify the safety of the content, and forward the content to the end user device 301 if it is safe.

In one embodiment, the at least one action that the action module 306 performs further comprises pre-rendering the requested content as an image for display on the end user device 301. In such an embodiment, the request may be sent to an action module 306 located on a server 108, e.g., a master entity 303 for the company/organization that issues, provides, or manages the end user device 301. The action module 306 at the master entity 303 may access the network source for the requested content and pre-render the received content as an image, e.g., take a screenshot of a website, convert a website to an image file, convert a document to an image, and/or the like. The action module 306 at the master entity 303 may then transmit the created image to the end user device 301. In this manner, the master entity 303, which may include additional security features, programs, algorithms, components, elements, or the like can access and pre-render the content from the network source that may be blocked or otherwise inaccessible to the end user device 301.

In one embodiment, the at least one action that the action module 306 performs further comprises providing a remote session, remote desktop connection, or the like from the master entity 303 to the end user device 301 of the content at the network source so that the end user device 301 does not access the content directly from the network source. For instance, if the request is for a website from a network location, the end user device 301 may send the request to the master entity 303 where the action module 306 accesses the website and provides a remote connection to the end user device 301 for viewing and interacting with the website without requiring the end user device 301 to directly access the website, and possibly putting the end user device 301 at risk.

In such an embodiment, network traffic may be segmented between directly accessing a "public" cloud website from an end user device 301, after a security check, and accessing a "private" cloud application from the end user device 301 through a cloud service by re-routing traffic from the end user device 301, to the cloud, and back to a server, e.g., an on-premises datacenter, based on a URL, port, and/or the like.

In one embodiment, the end user device 301 connects to the cloud and the cloud receives a connection pipe via a redirector sitting in front of the application (e.g., an on-demand cloud computing platform such as Amazon Web Services ("AWS") or located on-premises). In one embodiment, the redirector supports receiving inbound connections through the cloud to the particular application.

In such an embodiment, the action module 306 determines, based on user-attribute policies, whether or not a particular user should be allowed or denied access to the content from the network source via the redirector. Because the resource is located on-premises, in certain embodiments, the action module 306 routes the content from the network source to the cloud and the action module 306 at the cloud re-routes the content from the network source to the on-premises, e.g., private, application.

In one embodiment, the at least one action that the action module 306 performs further comprises replaying at least one header of the request for content at a remote device, e.g., a server 108 configured as a master entity 303 for the end user device, where the requested content is further analyzed. As used herein, replaying the at least one header may refer to the action module 306 intercepting and sending the network request to the master entity 303, or other remote device, where the request, the network source, and/or the content requested from the network source can be further analyzed for veracity without putting the end user device 301 at risk. In certain embodiments, the action module 306 replays the headers of the network request at the remote device if the network source for the request is not in the cache, e.g., is not on an allowed or blocked list. In this manner, the network source and/or the content requested from the network source can be analyzed at a device remote to the end user device 301 so that the end user device 301 is not at risk of being the target of a security threat, e.g., malware, viruses, or the like.

In an example embodiment, the action module 306 uses a client URL ("CURL") request command and replays the CURL request when a file is being downloaded. By doing so, a user may take the file and detonate it in the cloud (e.g., a Word document, a PDF file, an Excel file, and/or the like). As used herein, detonation may refer to the process of performing a full analysis of the file and not simply just a hash check, e.g., analyzing the content within the file. In this manner, the action module 306 does not download the file to the end user's device and then upload the file to the cloud.

In one embodiment, the at least one action that the action module 306 performs further comprises modifying the headers in the request. For instance, various websites may require cloud application controls instituted by the organization, e.g., Google®, Box®, access to apple.com emails, and/or the like. To accomplish this, the action module 306 performs some header modification and/or some generic custom request modification based on the website requirements.

For instance, the action module 306 may inject or modify the headers and/or message body for designated websites. For example, to perform tenant restriction on *.google.com, a proxy may inject X-GoogApps-Allowed-Domains header which will then restrict authentications to google.com. In another example, the action module 306 may modify headers to restrict requests to initiation logins to slack.com, for example, to only have acceptable domains. In yet another example, the action module 306 may modify the request body to redact certain content to restrict the uploading of documents.

In further embodiments, some cloud applications may restrict upload and/or download privileges. In such an embodiment, the action module 306 modifies or 'matches' specific values in the request header and/or response body of the website, and then modifies the response.

In one embodiment, the content module 308 is configured to analyze the content in response to the content being received at the end user device 301. For instance, the content module 308 may act as a secondary check on the safety of the content that is requested from the network source, even if the network source is identified in the cache as an allowed network source. The content module 308 located on the end user device 301 may perform the content analysis and/or a content module 308 located on a remote device, e.g., a master entity 303, may perform the content analysis for the end user device 301.

In one embodiment, the content analysis that the content module 308 performs includes a maliciousness analysis (to check for malware, viruses, trojan horses, worms, spyware, adware, and/or the like); a data sensitivity analysis (to determine a confidentiality, security level, access level, permission level, or the like of the data and ensure that the user for the end user device 301 has the requisite authorizations for viewing the content); a granular action control analysis (to determine whether the user of the end user device 301 is authorized to access the content and to determine the level of the user's access, e.g., full view, partial view, read, write, read/write, and/or the like); and a request body control analysis.

As used herein, a request body control analysis may refer to the data that the user is entering and how it is going to be sent to the cloud. For example, if the user attempts to disable two-factor authentication inside of an Okta Single Sign On console, the action module 306 can create a match for this request body and then allow the administrator to specifically restrict this action. In such an embodiment, regular expressions, or the like, may be used to create rules to identify matches in the data, which can be processor intensive, but because the action module 306 is located on the end user's device, it can be performed more efficiently than if it were to be performed on the cloud.

In various embodiments, the content module 308 analyzes content that is being uploaded to the cloud. For example, when a user drags-and-drops a file into a web browser, the content module 308 may detect what the file is by the drag-and-drop action (e.g., the file type, the file size, the file metadata, or the like) or may understand the underlying data in the request body payload. The content module 308 on the end user's device may perform a content check to ensure there is no sensitive or personally identifiable information ("PII")/protected health information ("PHI")/payment card information ("PCI") data in the file, that the file does not contain confidential information, that the file has a permissions level that satisfies the location where the file is being uploaded, and/or the like. If there is a conflict, the content module 308 may perform one of the following actions: allow (and monitor), notify an administrator (e.g., for confirmation to allow or deny), or block the file from being uploaded to the cloud.

In one embodiment, the update module 310 is configured to update the cache in response to the network source of the requested content not being found in the cache by checking the network source of the requested content against a remotely-stored master policy 204. For example, if a user attempts to visit a website that is not listed in the cache in the locally-stored policy 202, either as being allowed or blocked, the update module 310 may ping a master entity 303 with the network source for the request to determine whether the network source is listed in the master policy 204. If not, the action module 306 located at the master entity 303 may perform one of the actions above to verify the network source, provide a rendering of the content to the end user device 301, and/or the like.

In one embodiment, the update module 310 adds the network source of the requested content to the cache stored on the end user device 301, including an indication of whether the content requested from the network source is allowed on the end user device 301 based on a response from the update module 310 located on the master entity 303. If the action module 306 on the master entity 303 determines that the network source is an allowed source, the network module 302 on the end user device 301 may then resend the request to for content to the network source in response to receiving the confirmation that the network source is allowed from the master entity 303.

In one embodiment, the update module 310 further receives from the update module 310 located on the master entity 303, at least one additional network source of content that is related to the requested content. For example, if the user submits a request for the New York Times® at www.nytimes.com via a web browser, and www.nytimes.com is not listed in the cache of the locally-stored policy 202, the update module 310 sends the request for www.nytimes.com to the master entity 303 to check www.nytimes.com against the master policy 204 and/or to validate www.nytimes.com for access or not. The update module 310 at the master entity 303, upon validating www.nytimes.com may also send similar network sources to the end user device 301, e.g., www.wsj.com for the Wall Street Journal, www.washingtonpost.com for the Washington Post, and/or other similar news sites. The update module 310 on the end user device 301 then adds the additional network sources to the cache for the policy 202 stored on the end user device 301.

In one embodiment, the update module 310 at the master entity 303 determines the additional network sources based on trends among users, e.g., based on the browsing history of other users in the organization and/or based on the end user's own browsing history. In certain embodiments, the update module 310 uses machine learning or artificial intelligence to determine the additional network sources that are related to the request for content. As used herein, machine learning may refer to automatically improving computer algorithms based on experience and data. For instance, the update module 310 may train a machine learning model to recognize similar websites or other network locations based on the browsing history, trends, popular websites, and/or the like of users within the organization, based on the end user's browsing history, and/or the like. The trained machine learning model may then be used to forecast or predict one or more websites or network locations that are similar to a network source where content is being requested.

In one embodiment, the policy module 304 and/or the update module 310 periodically receives cache updates in a background process in response to the master policy 204 being changed. For example, if new network sources are added to or removed from an allowed or blocked list in the cache for the master policy 204, e.g., by an administrator for an organization, based on changes to commonly accessed websites (in general, regionally, for the organization, and/or the like), and/or the like, the policy module 304 and/or the update module 310 at the master entity 303 may push the updates to the locally-stored policy 202 on the end user device 301 (or multiple end user devices 301 within the organization). In certain embodiments, the policy module 304 and/or the update module 310 at the master entity 303 determines differences between the cache of the locally-stored policy 202 on the end user device 301 and the cache of the master policy 204 and only sends the differences between the caches. In other embodiments, the policy module 304 and/or the update module 310 at the master entity 303 periodically sends a full, updated policy, including a new cache, to the end user device 301, and removes or overwrites the old, outdated, locally-stored policy 202, including the cache, from the end user device 301.

In one embodiment, in response to the cache updates to the locally-stored policy 202, the policy module 304 and/or the update module 310 on the end user device 301 deletes, removes, flags for deletion, or the like network sources that have been added to the local cache based on the user's device activity. In some embodiments, instead of removing the end user's local changes to the cache on the end user device 301, the policy module 304 and/or the update module 310 validates each network source in the cache that is local to the end user's device 301 in response to the cache updates.

For example, the policy module 304 and/or the update module 310 on the end user device 301 may forward or send the local network sources to the master entity 303 where the policy module 304 and/or the update module 310 on the master entity 303 can verify, validate, or otherwise check the veracity of the network sources that are local to the end user's device 301 and keep them in the cache if valid. In other embodiments, the policy module 304 at the master entity 303 may monitor and track the cache for the end user device 301 (and other end user devices 301 for the organization) so that it knows what is in the cache for the end user device 301 and what the differences are between any updates to the cache for the master policy 304 and the cache for the locally-stored policy 202.

In one embodiment, the interface module 312 is configured to present an interface on the end user device 301 for manually configuring the policy for the end user device 301. The interface may include a graphical user interface for manually adding network sources to an allowed or blocked list, for validating a network source (e.g., against a master policy 204, based on a verification by the master entity 303, and/or the like), for changing other security configuration settings for the end user device 301, and/or the like.

Figure 4:
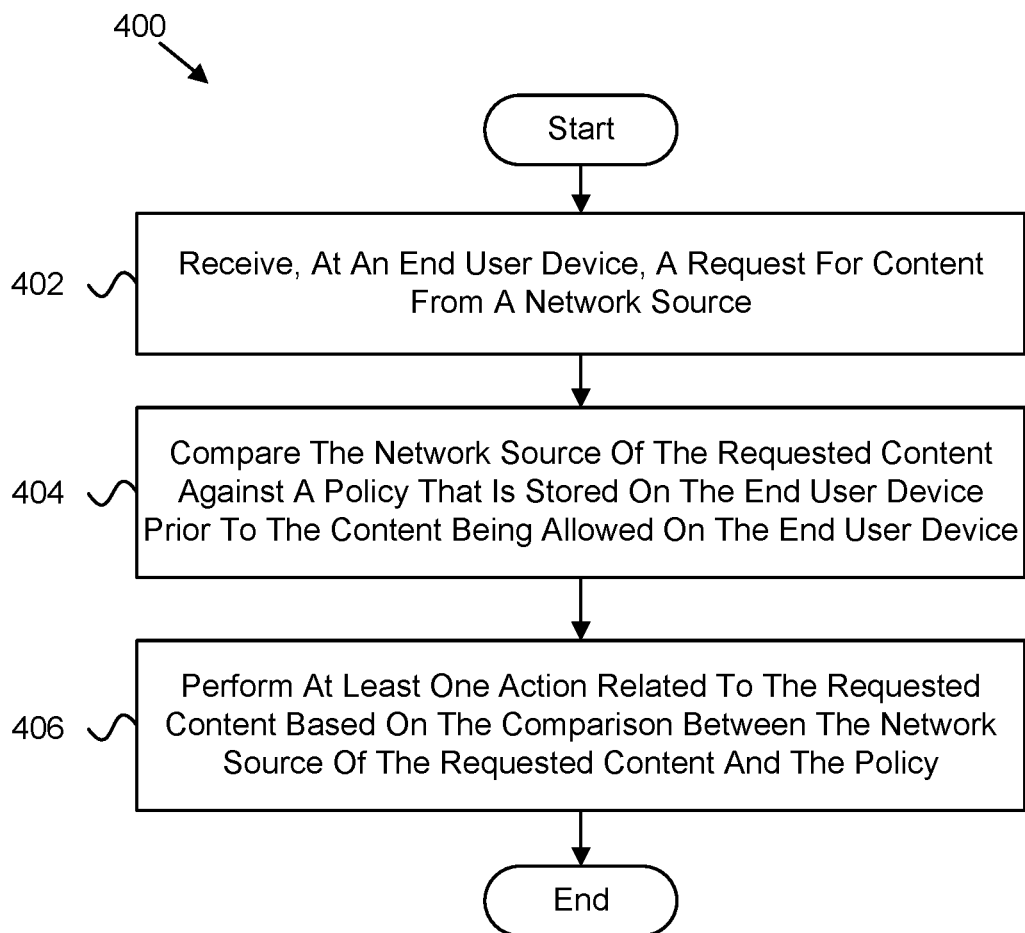
FIG. 4 is a schematic flow chart diagram illustrating one embodiment of a method for endpoint-based security.

FIG. 4 depicts a schematic flow chart diagram of one embodiment of a method 400 for endpoint-based security. In one embodiment, the method 400 begins and a network module 302 receives 402, at an end user device, a request for content from a network source. In further embodiments, a policy module 304 compares 404 the network source of the requested content against a policy that is stored on the end user device prior to the content being allowed on the end user device. In some embodiments, an action module 306 performs 406 at least one action related to the requested content based on the comparison between the network source of the requested content and the policy, and the method 400 ends.

Figure 5:
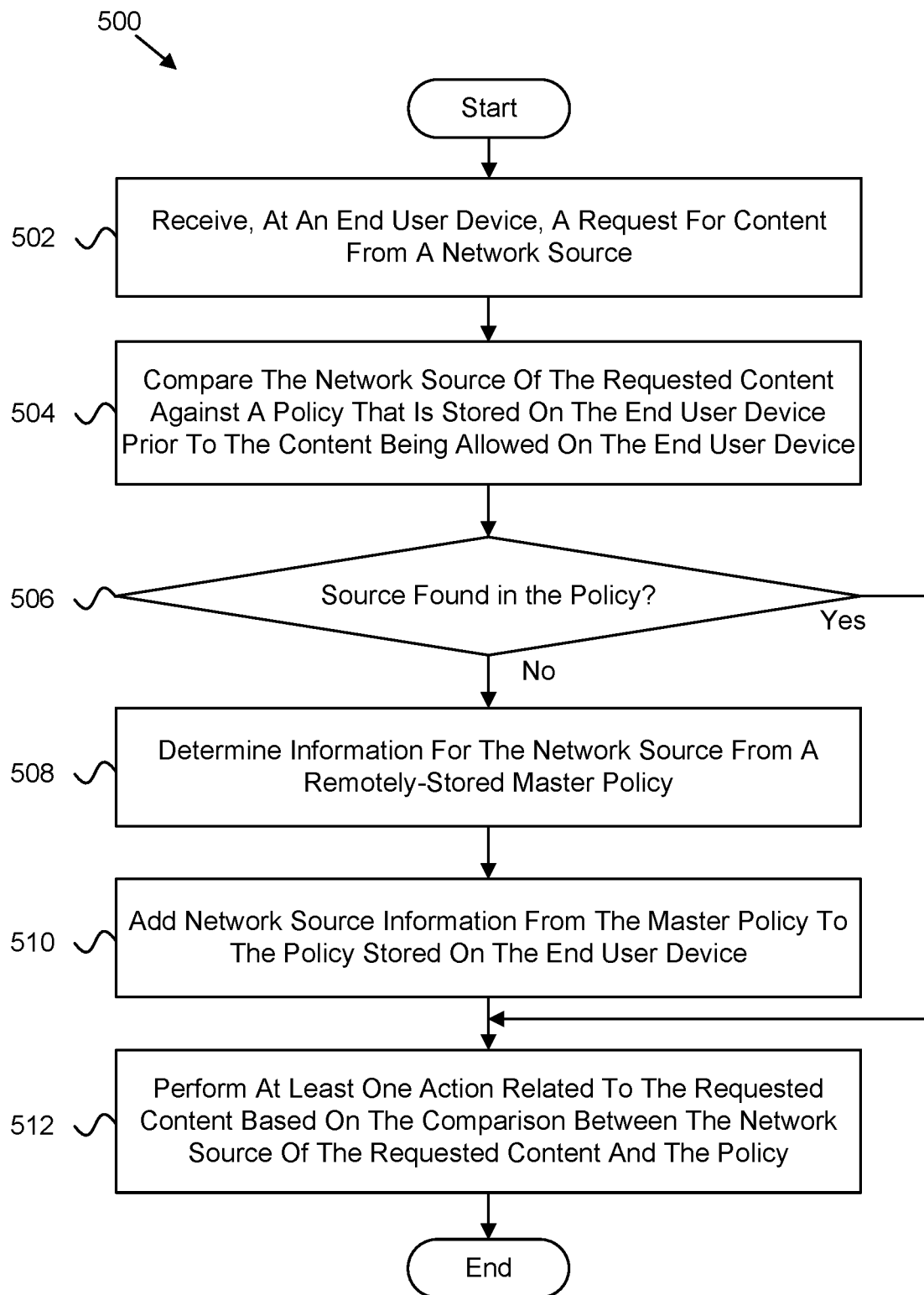
FIG. 5 is a schematic flow chart diagram illustrating one embodiment of a method for endpoint-based security.

FIG. 5 depicts a schematic flow chart diagram of one embodiment of a method 500 for endpoint-based security. In one embodiment, the method 500 begins and a network module 302 receives 502, at an end user device, a request for content from a network source. In further embodiments, a policy module 304 compares 504 the network source of the requested content against a policy that is stored on the end user device prior to the content being allowed on the end user device.

In certain embodiments, the policy module 304 determines 506 whether the network source is found in the policy. If so, in one embodiment, the action module 306 performs 512 at least one action related to the requested content based on the comparison between the network source of the requested content and the policy.

Otherwise, in one embodiment, the policy module 304 determines 508 information for the network source from a remotely-stored master policy. For example, the policy module 304 may send the request, which includes the network source, to a master entity for comparison against a master policy and/or for verifying the network source if it is not found in the master policy.

In one embodiment, the policy module 304 and/or the update module 310 adds 510 the network source information, including whether the network source is allowed or blocked, based on the master policy, to the policy that is stored locally on the end user device. In one embodiment, the action module 306 performs 512 at least one action related to the requested content based on the comparison between the network source of the requested content and the policy, and the method 500 ends.

Figure 6:
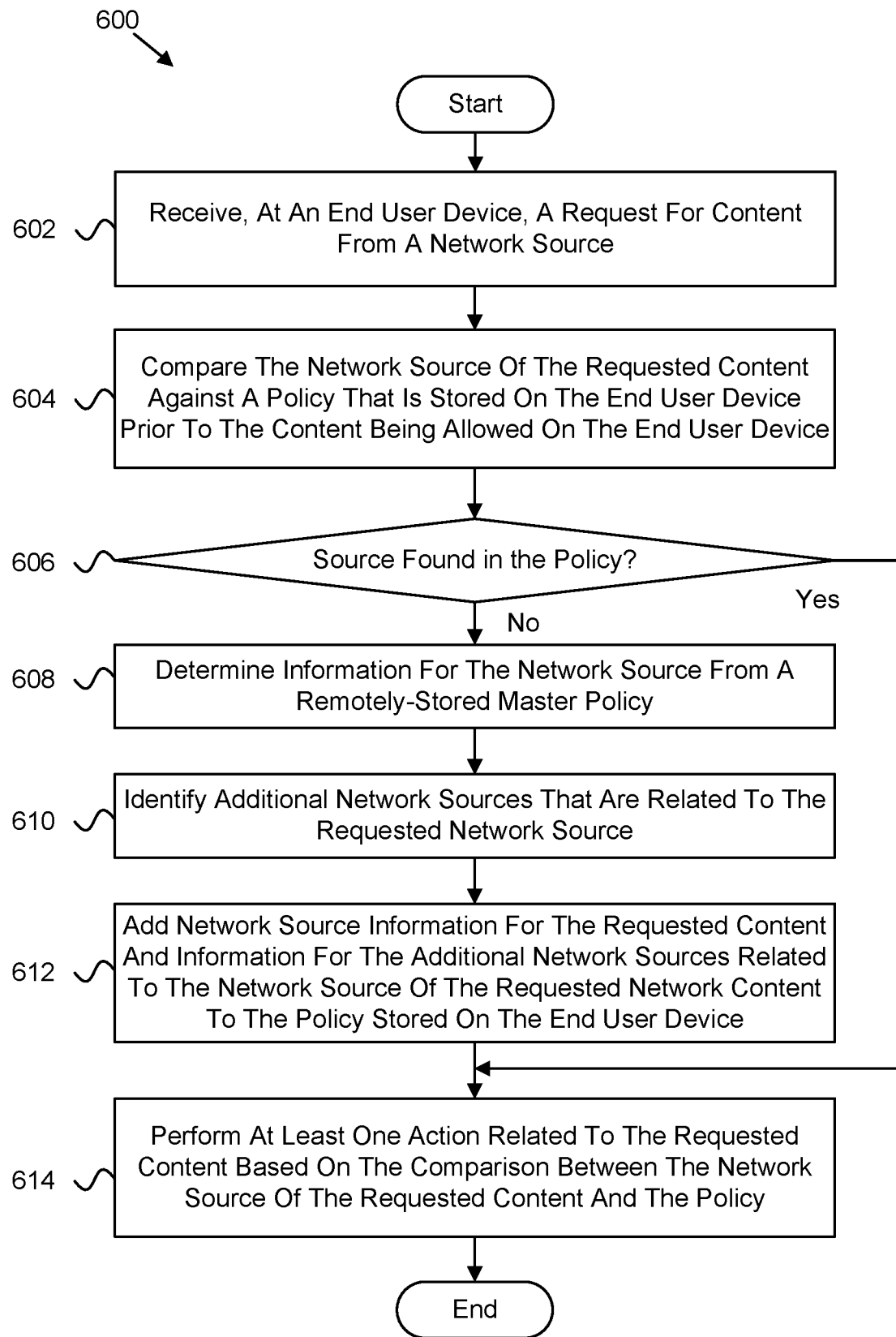
FIG. 6 is a schematic flow chart diagram illustrating one embodiment of a method for endpoint-based security.

FIG. 6 depicts a schematic flow chart diagram of one embodiment of a method 600 for endpoint-based security. In one embodiment, the method 600 begins and a network module 302 receives 602, at an end user device, a request for content from a network source. In further embodiments, a policy module 304 compares 604 the network source of the requested content against a policy that is stored on the end user device prior to the content being allowed on the end user device.

In certain embodiments, the policy module 304 determines 606 whether the network source is found in the policy. If so, in one embodiment, the action module 306 performs 614 at least one action related to the requested content based on the comparison between the network source of the requested content and the policy.

Otherwise, in one embodiment, the policy module 304 determines 608 information for the network source from a remotely-stored master policy. For example, the policy module 304 may send the request, which includes the network source, to a master entity for comparison against a master policy and/or for verifying the network source if it is not found in the master policy.

In one embodiment, the policy module 304 and/or the update module 310 identifies 610 additional network sources that are related to the requested network source, e.g., using machine learning. In further embodiments, the policy module 304 and/or the update module 310 adds 612 network source information for the requested content and information for the additional network sources related to the network source of the requested network content to the policy stored on the end user device.

In one embodiment, the action module 306 performs 614 at least one action related to the requested content based on the comparison between the network source of the requested content and the policy, and the method 600 ends.

Figure 7:
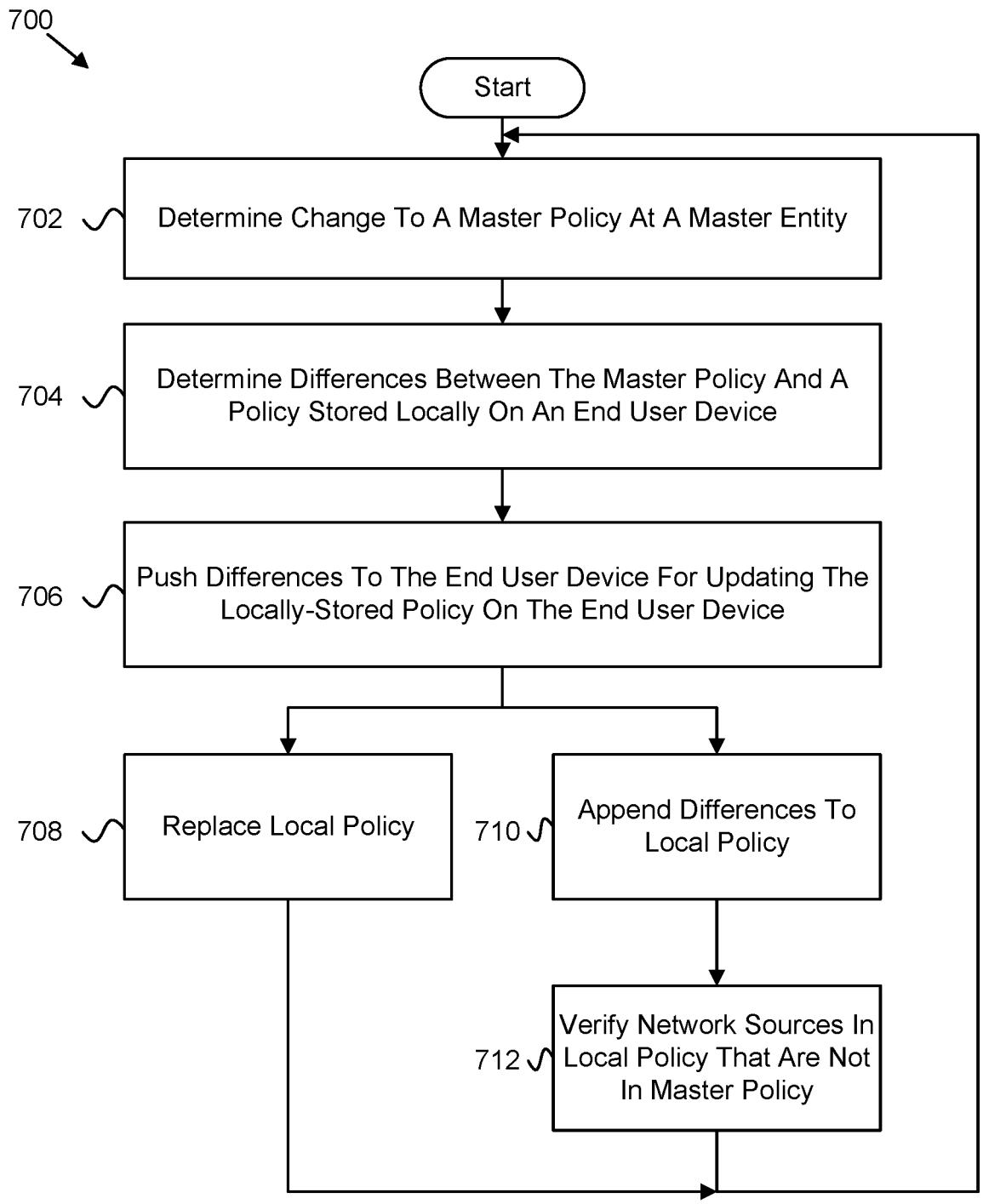
FIG. 7 is a schematic flow chart diagram illustrating one embodiment of a method for endpoint-based security.

FIG. 7 depicts a schematic flow chart diagram of one embodiment of a method 700 for endpoint-based security. In one embodiment, the method 700 begins and a policy module 304 located at a master entity determines 702 changes to a master policy. The changes may include updates to a cache of network sources, such as adding network sources to an allowed or blocked list, changing the status of already-listed network sources from allowed to blocked or vice-versa, configuration changes, and/or the like.

In one embodiment, the policy module 304 and/or the update module 310 located at the master entity determines 704 differences between the master policy and the policy that is stored locally on the end user device. For example, the policy module 304 and/or the update module 310 may monitor and track the policies stored on the end user devices. In another example, the policy module 304 and/or the update module 310 may request the locally-stored policy from the end user device to identify the differences, if any, between the local policy and the master policy.

In one embodiment, the policy module 304 and/or the update module 310 at the master entity sends, transmits, and/or otherwise pushes 706 the determined differences to the end user device. In one embodiment, the policy module 304 and/or the update module 310 replaces 708 the locally-stored policy with a copy of the master policy, which may overwrite any changes made the locally-stored policy on the end user device, and the method 700 continues to check for changes to the master policy.

In some embodiments, the policy module 304 and/or the update module 310 appends, updates, and/or adds 710 the determined differences to the locally-stored policy on the end user device. If the policy module 304 and/or the update module 310 determines that there are differences in the cache sets of allowed network sources between the local and master policies that are local to the policy on the end user device, the policy module 304 and/or the update module 310 at the master entity verifies 712 that the network sources local to the end user device's cache are not malicious (and if not, may add the network sources to the cache for the master policy), and the method 700 continues to check for changes to the master policy.

Figure 8:
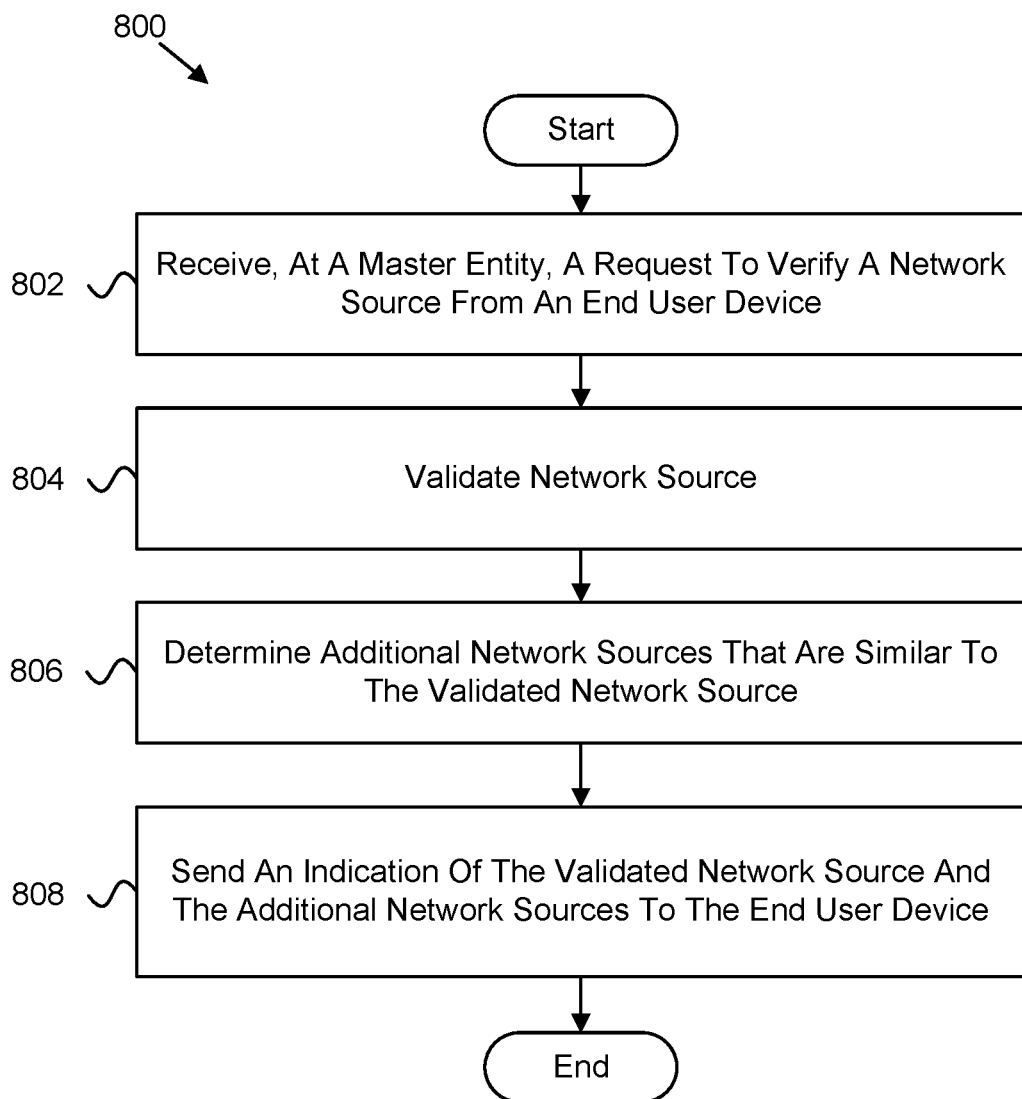
FIG. 8 is a schematic flow chart diagram illustrating one embodiment of a method for endpoint-based security.

FIG. 8 depicts a schematic flow chart diagram of one embodiment of a method 800 for endpoint-based security. In one embodiment, the method 800 begins and a network module 302 receives 802, at a master entity, a request to verify a network source from an end user device. The policy module 304, in one embodiment, validates 804 the network source and either determines that the network source is allowed or blocked from the end user device.

In one embodiment, the policy module 304 determines 806 additional network sources that are either allowed or blocked from the end user device that are similar to the verified (e.g., allowed, or blocked) network source. For example, if the verified network source is allowed on the end user device, the policy module 304 may identify other network sources that are allowed on the end user device and are not part of the end user device's cache. Similarly, if the verified network source is blocked on the end user device, the policy module 304 may identify other network sources that are not allowed on the end user device and are not part of the end user device's cache. The policy module 304 at the master entity may analyze other users' browsing trends, use machine learning, or check popular websites or other network sources that are accessed to determine the additional network sources. In this manner, for example, the master entity can anticipate similar network sources/websites/URLs that the end user may request on the end user device so that the policy module 304 on the end user device does not need to send another, similar network source to the master entity for verification.

The policy module 304 and/or the update module 310 sends 808 an indication of whether the network source is valid or blocked on the end user device, which the policy module 304 and/or the update module 310 on the end user device can use to update the cache for the local policy on the end user device, and also sends 808 the additional network sources to the end user device, including an indication of whether the additional network sources are allowed or blocked, and the method 800 ends.

Figure 9:
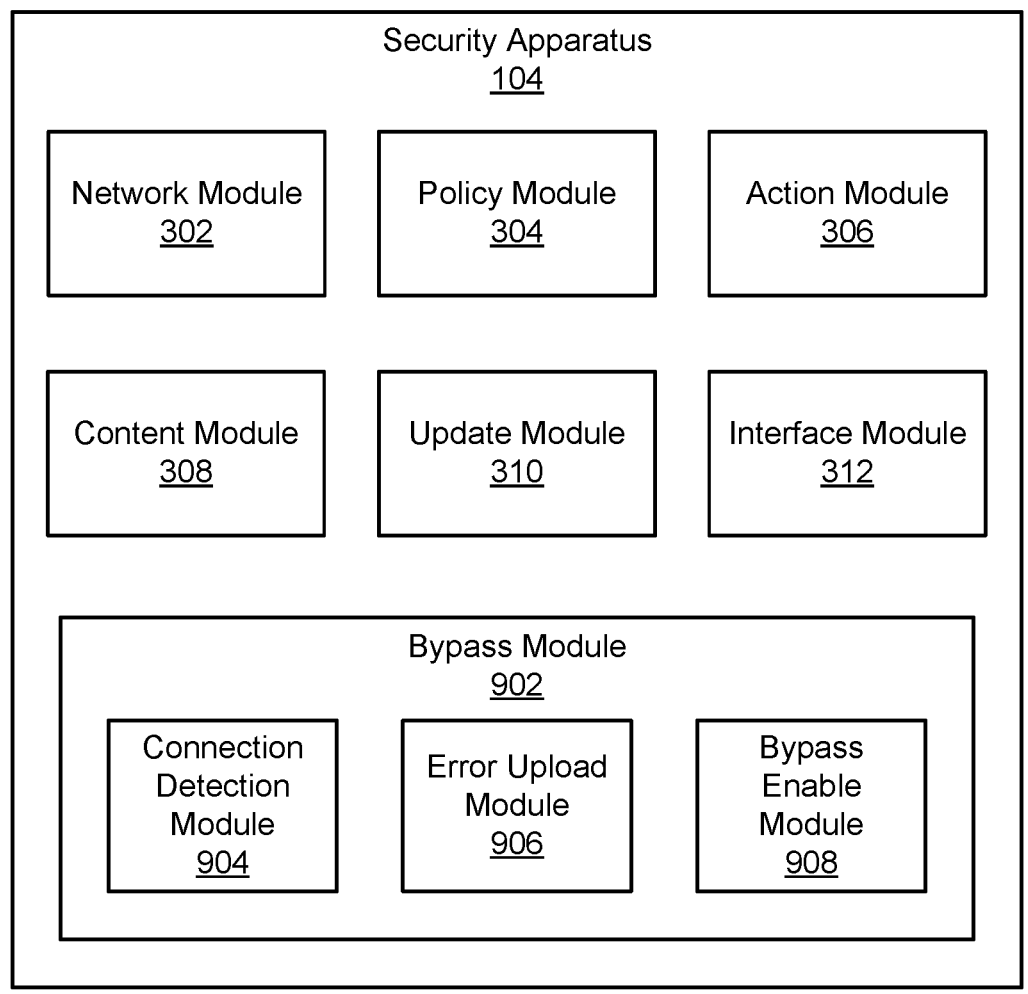
FIG. 9 is a schematic block diagram illustrating one embodiment of an apparatus for endpoint-based security.

FIG. 9 depicts another embodiment of an apparatus 900 for endpoint-based security. In one embodiment, the apparatus 900 includes an instance of a security apparatus 104. In one embodiment, the security apparatus 104 includes an interface module 302, a policy module 304, an action module 306, a content module 308, an update module 310, and an interface module 312, as described above. Further, the security apparatus 104 includes a bypass module 902 that includes a connection detection module 904, an error upload module 906, and a bypass enable module 908, which are described in more detail below.

In general the bypass module 902 is configured to detect that a connection between an application, program, API, or the like that is executing on an endpoint device, e.g., an end-user device, user equipment device, or the like, and a remote device, e.g., a remote server, is not connected, is disconnected, or otherwise is not available. In such an embodiment, the network traffic between the application and the remote device may be routed through a proxy. Accordingly, the bypass module 902 may determine that the disconnection may be due to an SSL issue, e.g., during an initial handshaking process between the application and the remote device. The bypass module 902 may receive, determine, reference, check, or the like a workflow or other process for enabling SSL bypass, URL bypass, or the like on the endpoint device so that the SSL process is bypassed at the proxy and the connection between the application on the endpoint device and the remote device is (re) established.

In one embodiment, the connection detection module 904 is configured to detect that a network connection between an application executing and a remote device is not connected due to an SSL error. As used herein, SSL may refer to network protocols for establishing authenticated and encrypted links between networked computers and devices. As described in more detail below, an SSL error may arise if there is an issue in establishing a network connection between networked devices, e.g., during a handshaking procedure between an endpoint device and a remote server.

In one embodiment, the SSL connection error may be due to routing network traffic through a proxy service or device. For example, an application on the endpoint device, e.g., a Dropbox® client may attempt to establish a connection with a backend, remote server, e.g., a Dropbox® server using an SSL-enabled connection. The Dropbox® client may attempt to send network traffic to the Dropbox® backend via a proxy (e.g., running on the endpoint device and/or located at a different device) using SSL to establish the network connection. The proxy may decrypt the SSL-secured traffic to analyze or inspect the information, e.g., for malicious code, man-in-the-middle attacks, or the like, and then forward the network traffic to the destination—the Dropbox® backend. The Dropbox® backend, however, may only accept network information that is identified as originating from the Dropbox® client on the endpoint device (e.g., as determined from the issuing certificate for the network traffic) and may ignore network traffic from the proxy, may not allow network traffic from the proxy, and/or the like. Accordingly, analyzing or inspecting SSL secured network traffic at the proxy may need to be bypassed to allow network connections between certain applications and their associated remote backends/servers.

In one embodiment, the connection detection module 904 detects that the network connection between the application and the remote device is not connected due to the SSL error by intercepting an error message from the application indicating that the connection to the remote device is closed. In such an embodiment, when the application determines that establishing a connection to the remote device is not successful, the application may trigger, generate, transmit, and/or the like an error message that includes details about the connection failure such as the type of error, the cause of the error, and/or the like. For instance, the error message may indicate that there was an issue with attempting to connect to the remote server during a handshaking process and may include information identifying the particular issue, e.g., an SSL issue, a certificate issue, or the like. Similarly, the remote device, or an application executing on the remote device, may transmit an error message to the proxy that indicates that the network traffic for establishing the network connection was blocked, ignored, or otherwise not allowed due to an SSL or certificate issue. The connection detection module 904 may intercept or otherwise receive the error message, analyze the message, and determine that the message indicates that the connection error is an SSL error.

In one embodiment, the connection detection module 904 detects that the network connection between the application and the remote device is not connected due to the SSL error by detecting that the application continually retries to establish a connection to the remote device without receiving a response. Continuing with the example above, if the connection detection module 904 detects that a Dropbox® client on the endpoint device continuously attempts to establish a network connection with a Dropbox® backend and the connection is not successfully established, the connection detection module 904 may determine, infer, detect, or the like that there is an SSL issue with establishing the connection.

In one embodiment, the connection detection module 904 detects that the network connection between the application and the remote device is not connected due to the SSL error by detecting that the network connection between the application and the remote device closed prematurely. Continuing with the example above, if the connection detection module 904 detects that a connection between the Dropbox® client and the Dropbox® backend is prematurely disconnected, e.g., without gracefully disconnecting via one or more disconnection messages, the connection detection module 904 may determine, infer, detect, or the like that there is an SSL issue with establishing the connection.

In one embodiment, the error upload module 906 uploads the SSL error information to a central server, e.g., to a proxy server, a proxy-management device, an administrative system, and/or the like. In such an embodiment, the SSL error information may include identifying information for the application that triggered the SSL error, e.g., Dropbox®. In such an embodiment, the bypass module 902 executing on the central server may push information for resolving the SSL error to the endpoint device and/or one or more other endpoint devices that the central service manages, e.g., as part of the policy 202 that is pushed out to the different endpoint devices. In such an embodiment, the bypass module 902 pushes the SSL bypass information to every device that the central server manages (e.g., every device within an organization) or to a subset of devices that an administrator may specify or select.

In such an embodiment, the bypass enable module 908 is configured to receive instructions from the central server for performing an SSL inspection bypass procedure on the endpoint device to establish the network connection between the application and the remote device. In one embodiment, the instructions may include instructions for adding the application, domain, URL, remote device, or the like to a policy, whitelist, cache, table, or the like that identify applications, domains, URLs, remote devices, or the like that are not subject to SSL inspection so that applications executing on the endpoint device can successfully establish a connection to the remote device via a proxy service or device while bypassing SSL inspection, analysis, decryption, or the like.

In such an embodiment, the bypass enable module 908 automatically enables SSL bypass for the application, domain, URL, remote device, or the like without any user intervention, e.g., without user confirmation, user input, or the like. For instance, in response to detecting an SSL error associated with a connection between an application on the endpoint device and a remote device, the bypass enable module 908 may add the application to a list of applications that are not subject to SSL inspection, e.g., at the proxy, and trigger or signal to the application to attempt to establish the network connection with the remote device again.

In one embodiment, the bypass enable module 908 prompts a user of an endpoint device, a system administrator (e.g., for a proxy), or the like to allow or deny bypassing SSL inspection for an application, domain, URL, remote device, or the like. In such an embodiment, the bypass enable module 908 provides an interface as part of an administration system that allows a user such as an administrator to selectively allow and deny SSL bypass for certain applications, domains, URLs, remote devices, or the like, and/or set other parameters such as the time period that SSL bypass is enabled for an application (e.g., perpetually, for a year, month, day, hour, or the like).

In one embodiment, the bypass enable module 908 presents instructions, guides, videos, or the like for guiding a user through the steps for manually enabling SSL bypass on the endpoint device. In such an embodiment, the bypass enable module 908 may prompt the user for credentials or other identifying information to ensure that the user has authorization or permission to change the SSL connection settings on the endpoint device and/or at the proxy. The instructions may include instructions for adding the application to a whitelist, policy, cache, or the like of applications that are allowed to establish remote network connections while avoiding SSL inspection.

Figure 10:
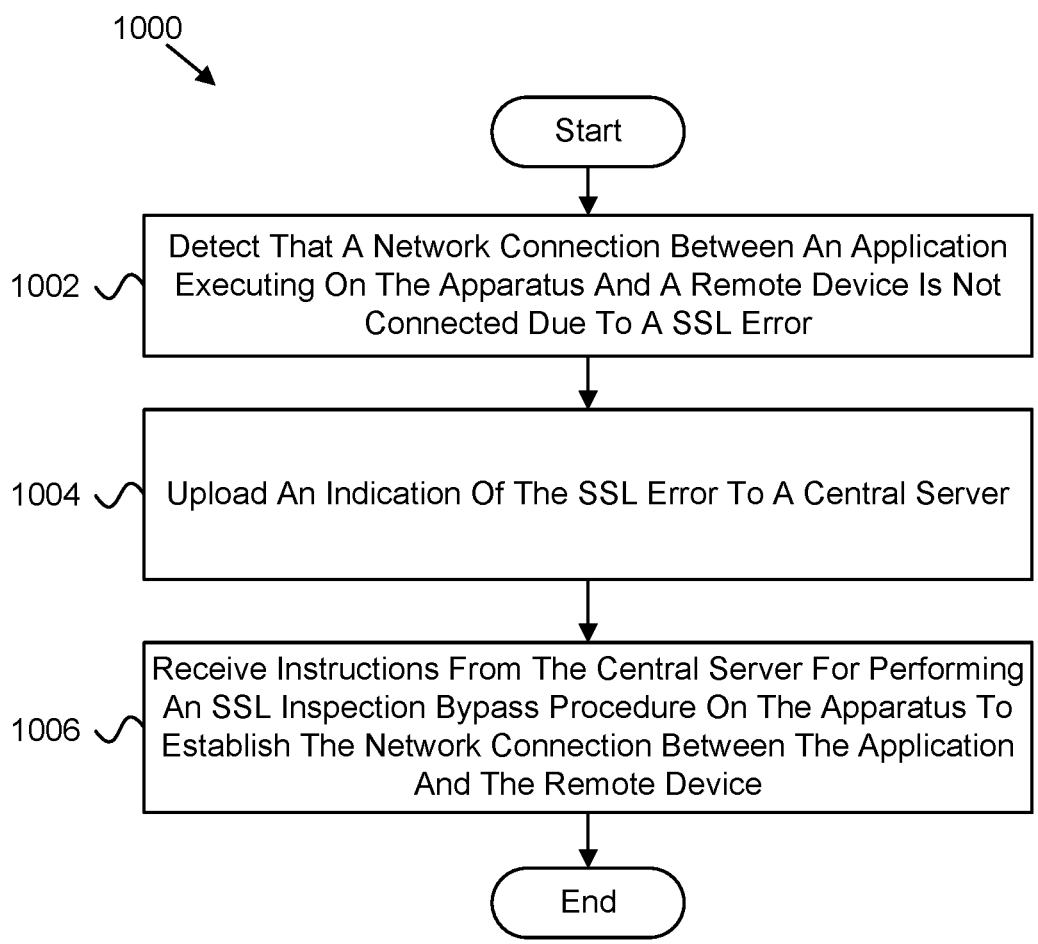
FIG. 10 is a schematic flow chart diagram illustrating one embodiment of a method for endpoint-based security.

FIG. 10 depicts a schematic flow chart diagram of one embodiment of a method 1000 for endpoint-based security. In one embodiment, the method 1000 is performed at an endpoint device by a bypass module 902, a connection detection module 904, an error upload module 906, a bypass enable module 908, a security apparatus 104, a network interface, a processor (e.g., a CPU, a processor core, an FPGA or other programmable logic, an ASIC, a controller, a microcontroller, and/or another semiconductor integrated circuit device), an HDMI or other electronic display dongle, a hardware appliance or other hardware device, other logic hardware, and/or other executable code stored on a computer readable storage medium.

In one embodiment, the method 1000 begins and detects 1002 that a network connection between an application executing on an endpoint device and a remote device is not connected due to an SSL error. In one embodiment, the method 1000 uploads 1004 an indication of the SSL error to a central server. In one embodiment, the method 1000 receives 1006 instructions from the central server for performing an SSL inspection bypass procedure on the endpoint device to establish the network connection between the application and the remote device, and the method 1000 ends.

Figure 11:
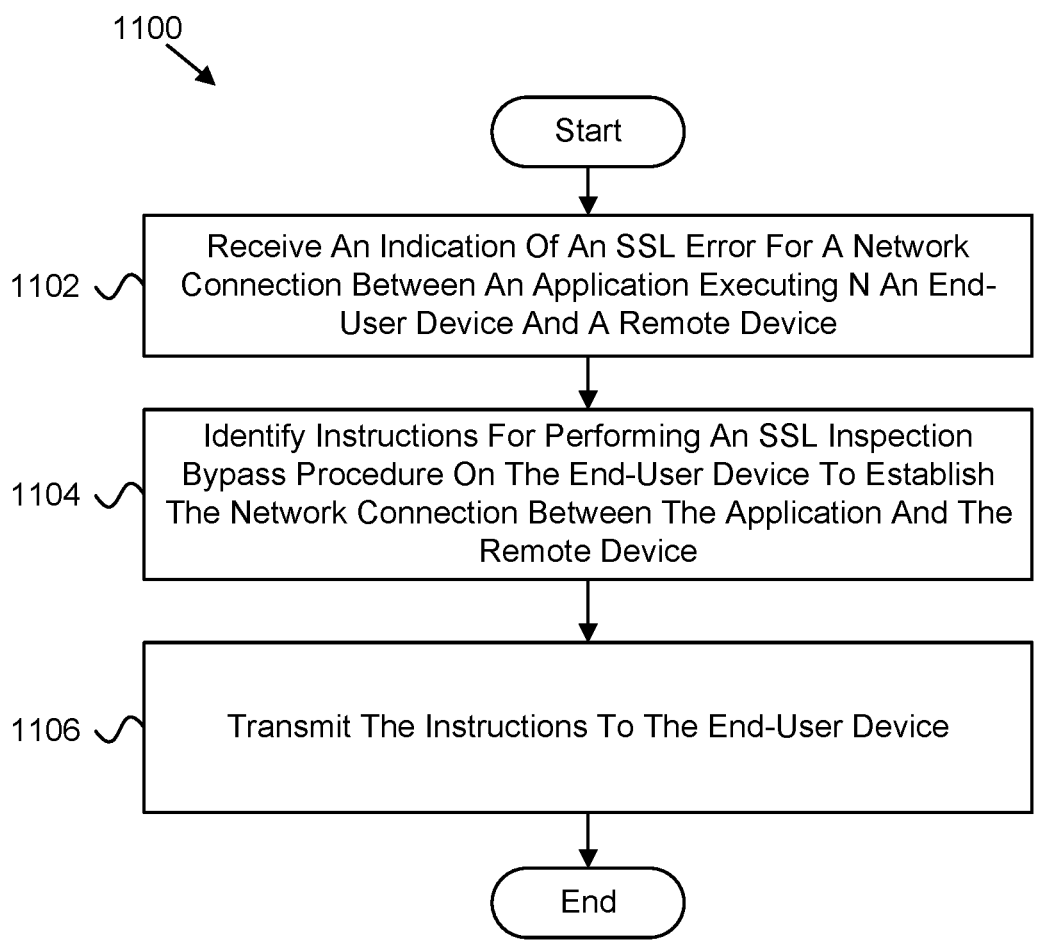
FIG. 11 is a schematic flow chart diagram illustrating one embodiment of a method for endpoint-based security.

FIG. 11 depicts a schematic flow chart diagram of one embodiment of a method 1100 for endpoint-based security. In one embodiment, the method 1100 is performed at a central or management device/server by a bypass module 902, a connection detection module 904, an error upload module 906, a bypass enable module 908, a security apparatus 104, a network interface, a processor (e.g., a CPU, a processor core, an FPGA or other programmable logic, an ASIC, a controller, a microcontroller, and/or another semiconductor integrated circuit device), an HDMI or other electronic display dongle, a hardware appliance or other hardware device, other logic hardware, and/or other executable code stored on a computer readable storage medium.

In one embodiment, the method 1100 begins and receives 1102 an indication of an SSL error for a network connection between an application executing n an end-user device and a remote device. In one embodiment, the method 1100 identifies 1104 instructions for performing an SSL inspection bypass procedure on the end-user device to establish the network connection between the application and the remote device. In one embodiment, the method 1100 transmits 1106 the instructions to the end-user device, and the method 1100 ends.

A means for receiving, at an end user device, a request for content from a network source, may include a network module 302, a security apparatus 104, a server 108, a processor, an FPGA, an ASIC, an information handling device 102, an end user device 301, a master entity 303, other logic hardware, and/or other executable code stored on a computer readable storage medium. Other embodiments may include similar or equivalent means for receiving, at an end user device, a request for content from a network source.

A means for comparing the network source of the requested content against a policy that is stored on the end user device prior to the content being allowed on the end user device, may include a policy module 304, a security apparatus 104, a server 108, a processor, an FPGA, an ASIC, an information handling device 102, an end user device 301, a master entity 303, other logic hardware, and/or other executable code stored on a computer readable storage medium. Other embodiments may include similar or equivalent means for comparing the network source of the requested content against a policy that is stored on the end user device prior to the content being allowed on the end user device.

A means for performing at least one action related to the requested content based on the comparison between the network source of the requested content and the policy, may include an action module 306, a security apparatus 104, a server 108, a processor, an FPGA, an ASIC, an information handling device 102, an end user device 301, a master entity 303, other logic hardware, and/or other executable code stored on a computer readable storage medium. Other embodiments may include similar or equivalent means for performing at least one action related to the requested content based on the comparison between the network source of the requested content and the policy.

A means for detecting that a network connection between an application executing on an endpoint device and a remote device is not connected due to an SSL error, may include a connection detection module 904, a bypass module 902, a security apparatus 104, a server 108, a processor, an FPGA, an ASIC, an information handling device 102, an end user device 301, a master entity 303, other logic hardware, and/or other executable code stored on a computer readable storage medium. Other embodiments may include similar or equivalent means for detecting that a network connection between an application executing on an endpoint device and a remote device is not connected due to an SSL error.

A means for uploading an indication of the SSL error to a central server, may include an error upload module 906, a bypass module 902, a security apparatus 104, a server 108, a processor, an FPGA, an ASIC, an information handling device 102, an end user device 301, a master entity 303, other logic hardware, and/or other executable code stored on a computer readable storage medium. Other embodiments may include similar or equivalent means for uploading an indication of the SSL error to a central server.

A means for receiving instructions from the central server for performing an SSL inspection bypass procedure on the endpoint device to establish the network connection between the application and the remote device, may include a bypass enable module 908, a bypass module 902, a security apparatus 104, a server 108, a processor, an FPGA, an ASIC, an information handling device 102, an end user device 301, a master entity 303, other logic hardware, and/or other executable code stored on a computer readable storage medium.

Other embodiments may include similar or equivalent means for receiving instructions from the central server for performing an SSL inspection bypass procedure on the endpoint device to establish the network connection between the application and the remote device.

Means for performing the other method steps described herein, in various embodiments, may include one or more of an information handling device 102, a server 110, a network module 302, a policy module 304, an action module 306, a content module 308, an update module 310, an interface module 312, a bypass module 902, a connection detection module 904, an error upload module 906, a bypass enable module 908, a security apparatus 104, a network interface, a processor (e.g., a CPU, a processor core, an FPGA or other programmable logic, an ASIC, a controller, a microcontroller, and/or another semiconductor integrated circuit device), an HDMI or other electronic display dongle, a hardware appliance or other hardware device, other logic hardware, and/or other executable code stored on a computer readable storage medium. Other embodiments may include similar or equivalent means for performing one or more of the method steps described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor; and
a memory coupled to the processor, the memory comprising instructions that are executable by the processor to:
detect that a network connection between an application executing on the apparatus and a remote device is not connected due to a secure socket layer ("SSL") error;
upload an indication of the SSL error to a central server; and
receive instructions from the central server for performing an SSL inspection bypass procedure on the apparatus to establish the network connection between the application and the remote device.

2. The apparatus of claim 1, wherein network traffic between the application and the remote device is routed through a proxy.

3. The apparatus of claim 1, wherein the instructions are executable by the processor to detect that the network connection between the application and the remote device is not connected due to the SSL error by intercepting an error message from the application indicating that the connection to the remote device is closed.

4. The apparatus of claim 3, wherein the error message indicates a failure with an SSL handshake procedure between the application and the remote device.

5. The apparatus of claim 1, wherein the instructions are executable by the processor to detect that the network connection between the application and the remote device is not connected due to the SSL error by detecting that the application continually retries to establish a connection to the remote device without receiving a response.

6. The apparatus of claim 1, wherein the instructions are executable by the processor to detect that the network connection between the application and the remote device is not connected due to the SSL error by detecting that the network connection closed prematurely.

7. The apparatus of claim 1, wherein the instructions are executable by the processor to prompt the user for confirmation to bypass SSL inspection for the application as part of the SSL bypass procedure.

8. The apparatus of claim 1, wherein the instructions are executable by the processor automatically enable SSL inspection bypass for the application without user intervention.

9. The apparatus of claim 1, wherein the instructions are executable by the processor to add the application to a whitelist of applications that bypass SSL inspection as part of the SSL inspection bypass procedure.

10. A method, comprising:
detecting that a network connection between an application executing on an end-user device and a remote device is not connected due to a secure socket layer ("SSL") error;
upload an indication of the SSL error to a central server; and
receive instructions from the central server for performing an SSL inspection bypass procedure on the end-user device to establish the network connection between the application and the remote device.

11. The method of claim 1, wherein network traffic between the application and the remote device is routed through a proxy.

12. The method of claim 1, wherein detecting that the network connection between the application and the remote device is not connected due to the SSL error comprises intercepting an error message from the application indicating that the connection to the remote device is closed.

13. The method of claim 12, wherein the error message indicates a failure with an SSL handshake procedure between the application and the remote device.

14. The method of claim 1, wherein detecting that the network connection between the application and the remote device is not connected due to the SSL error comprises detecting that the application continually retries to establish a connection to the remote device without receiving a response.

15. The method of claim 1, wherein detecting that the network connection between the application and the remote device is not connected due to the SSL error comprises detecting that the network connection closed prematurely.

16. The method of claim 1, further comprising prompting the user for confirmation to bypass SSL inspection for the application as part of the SSL bypass procedure.

17. The method of claim 1, further comprising automatically enabling SSL inspection bypass for the application without user intervention.

18. The method of claim 1, further comprising adding the application to a whitelist of applications that bypass SSL inspection as part of the SSL inspection bypass procedure.

\* \* \* \* \*